United States Patent [19]
Crandall

[11] Patent Number: 5,746,548
[45] Date of Patent: May 5, 1998

[54] CORE LOCK PIVOT SYSTEM

[75] Inventor: Robert M. Crandall, Capac, Mich.

[73] Assignee: Harman Automotive, Inc., Farmington Hills, Mich.

[21] Appl. No.: 803,159

[22] Filed: Feb. 19, 1997

[51] Int. Cl.$^6$ .................................................. F16C 11/06
[52] U.S. Cl. ........................ 403/316; 403/122; 403/315; 248/481
[58] Field of Search ............................ 403/122, 128, 403/127, 133, 135, 143, 76, 90, 114, 315, 316, 317, 318, 319; 248/481, 181.1, 283.31

[56]         References Cited
          U.S. PATENT DOCUMENTS

| | | | |
|---|---|---|---|
| 3,367,728 | 2/1968 | Labbie | 403/122 X |
| 3,776,649 | 12/1973 | Kemezys | 403/90 |
| 4,504,165 | 3/1985 | Moeremans | 248/481 X |
| 4,520,983 | 6/1985 | Templeman | 248/481 |
| 4,565,345 | 1/1986 | Templeman | 248/481 |
| 4,601,603 | 7/1986 | Nakayama | 403/143 |
| 4,694,544 | 9/1987 | Chapman | 403/316 X |
| 4,986,688 | 1/1991 | Tuan et al. | 403/127 |
| 5,038,978 | 8/1991 | Kolton et al. | 403/90 X |
| 5,562,357 | 10/1996 | Sandell | 403/122 |

FOREIGN PATENT DOCUMENTS 2196690  5/1988  United Kingdom ............... 403/122

*Primary Examiner*—Harry C. Kim
*Attorney, Agent, or Firm*—Dykema Gossett PLLC

[57] ABSTRACT

A pivot connection system includes an elongated member having a generally ball-shaped end. A rigid socket is sized to receive the ball-shaped end. The rigid socket has a first opening into which the ball-shaped end is inserted and a second opening. The ball-shaped end has a width greater than the width of the first opening. The ball-shaped end has a deformable hollow core. A core lock is sized to be received within the core to prevent the core from deforming after the ball-shaped end is inserted into the socket.

13 Claims, 3 Drawing Sheets

CORE LOCK PIVOT SYSTEM

BACKGROUND OF THE INVENTION

The present invention relates to a pivot coupling system and, more specifically, to a ball and socket type pivot system.

Ball and socket connections are suitable for a variety of applications in which one member pivots with respect to another member. Many known configurations of ball and socket connections are not suitable for small applications. Another drawback is that many connections are unreliable when place under pressure. That is, the connections may disassemble.

One type of ball and socket connection uses a flexible socket that is expanded as the ball is forced into the socket. The socket has a number of slots in the outer wall of the socket to allow for expansion. The ball can then be easily forced into the socket and the socket will expand to conform to the ball. One problem with such a system is that the ball is unable to withstand much force. That is, the ball may easily be popped out of the socket.

Another type of ball and socket type of coupling system uses a separate ring or arc which attaches to the socket after inserting the ball within the socket. The ring prevents the ball from being removed. The uses for such a configuration are typically for heavy machinery. Such a coupling configuration is not practically adapted to smaller, cost effective applications.

It would therefore be desirable to provide a ball and socket configuration which is easy to assemble and disassemble and that is also cost-effective to manufacture in a mass production type industry.

SUMMARY OF THE INVENTION

The pivot connection system of the present invention has an elongated member that has a generally ball-shaped end. A socket is sized to receive the ball-shaped end. The socket has a first opening into which the ball-shaped end is inserted and a second opening. The ball-shaped end has a width greater than the width of the first opening. The ball-shaped end also has a deformable hollow core. A core lock that is sized to be received within the core prevents the core from deforming after the ball-shaped end is inserted into the socket.

One feature of the invention is that the core lock has a generally spherical shape and has a radial opening therein to receive an insertion tool.

In another aspect of the invention, a method for forming a pivot connection comprises deforming a flexible ball-shaped end of an elongated member, inserting the flexible ball-shaped end into a rigid socket so that the member extends through a first opening in the socket. The method for forming a pivot connection further includes the steps of inserting a core lock into a hollow core of the ball-shaped end through a second opening in the socket and preventing the deformation of the core to prevent the removal of the ball-shaped end from the socket.

One advantage of the present invention is that the socket may be segmented to allow for pressure variations caused by expansion and contraction of the ball-shaped end.

Another advantage of the present invention is that the second opening through which the core lock is inserted into the ball-shaped end may be located at any position on the socket. Thus, the core lock pivot system may be adapted for a variety of uses which are particularly suitable for automotive applications.

Still another advantage of the present invention is the ability of the ball-shaped end to be retained within the socket under high stress or instantaneous high stress loads.

A further advantage is that the core lock system is easily dismantled by removing the core lock from the ball-shaped end. Such a dismantleable configuration is desirable in automotive applications to facilitate serviceability.

BRIEF DESCRIPTION OF THE DRAWINGS

Other features and advantages of the present invention will become apparent from the detailed description which should be read in conjunction with the drawings in which.

DETAILED DESCRIPTION OF THE PREFERRED EMBODIMENT

Figure 1:
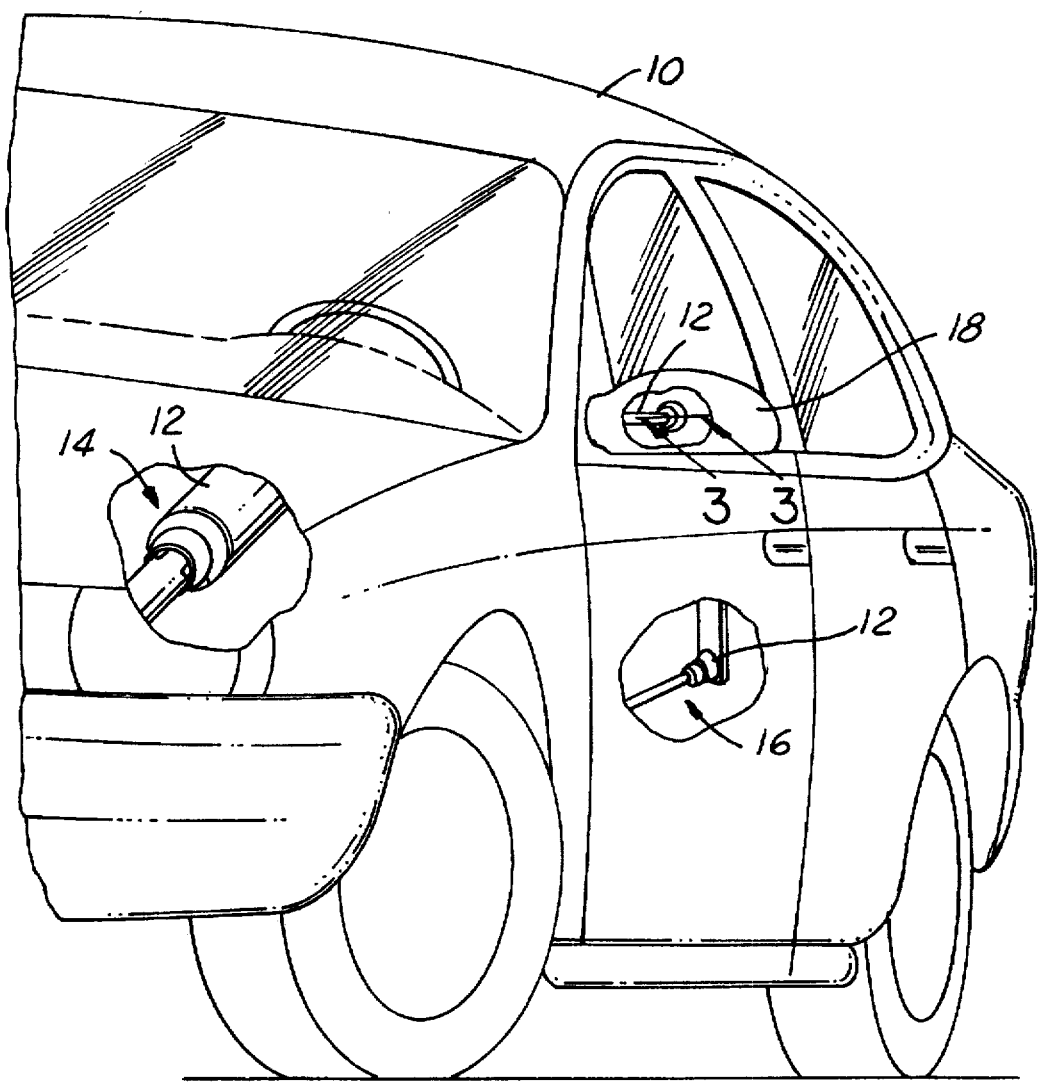
FIG. 1 is a perspective view of an automotive vehicle having partial cutaways showing some automotive vehicle applications of a core lock pivot system according to the present invention.

Referring now to the drawings, like reference numerals are used to identify identical components in the various views. While the core lock pivot system is illustrated with respect to three automotive applications, one skilled in the art would recognize that many applications outside the automotive field exist for the core lock pivot system.

Referring now to FIG. 1, an automotive vehicle 10 is shown having a plurality of core lock pivot systems 12 for use in various applications. For example, a core lock pivot system 12 may be used in the vehicle steering system which is generally represented by 14. Another application in automotive vehicle 10 that may be suitable for use of a core lock pivot system 12 is in the raising and lowering hardware for the windows which is generally represented by 16. Still another application for a core lock pivot system 12 may be for use in pivoting an outside rear view mirror which is generally represented by 18.

Figure 2:
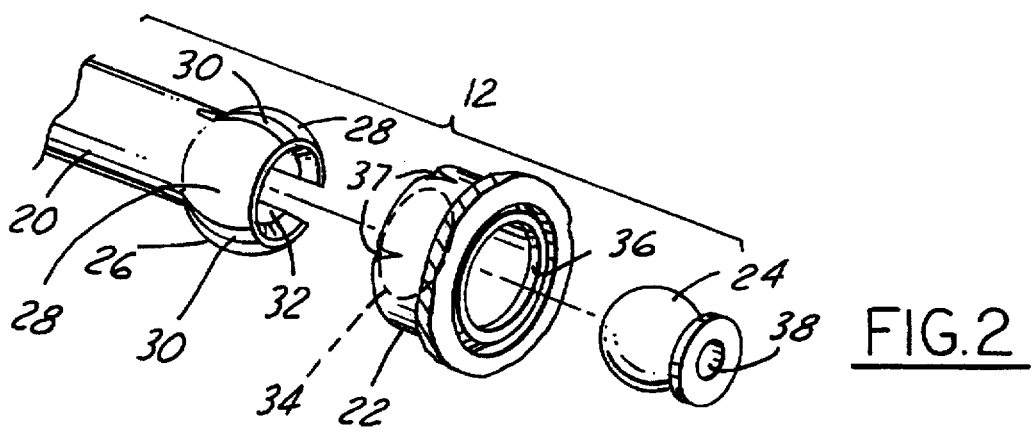
FIG. 2 is an exploded view of a core lock pivot system according to the present invention.

Referring now to FIG. 2, core lock pivot system 12 generally has a connection member 20, a socket 22 and a core lock 24. Connection member 20, socket 22 and core lock 24 are all preferably made of a plastic or nylon material. The material used must be capable of withstanding the temperature and wear requirements for the particular application.

Connection member 20 has a ball-shaped end 26 which is preferably integrally formed with connecting member 20. Ball-shaped end 26 preferably has at least two segments 28. Segments 28 have spaces 30 therebetween. Ball-shaped end 26 also preferably has a hollow core 32. Spaces 30 preferably cooperate with core 32 to allow ball-shaped end 26 to deform. The deformation reduces the size of spaces 30 and core 32. When deformed the diameter of the ball-shaped end 26 is reduced.

Socket 22 has a first opening generally shown in hidden lines 34. The inside of socket 22 is generally shaped to correspond to the outside of ball-shaped end 26. First opening 34 is sized smaller than the diameter of ball-shaped end 26 so that the ball-shaped end 26 must be deformed while being inserted into socket 22. The socket also has a second opening 36 that is sized to receive core lock 24. Core lock 24 has a generally spherical shape which corresponds to the shape of core 32 of ball-shaped end 26. Core lock 24 is inserted into the core 32 after ball-shaped end 26 is inserted into socket 22. Core lock 24 prevents ball-shaped end 26 from deforming and thus being removed from socket 22. Core lock 24 preferably has a radial channel 38 therein. Channel 38 is sized to receive an insertion tool (not shown). Channel 38 may also be used to receive a tool to facilitate removal of core lock 24 from core 32 when disassembly is desired. Second opening 36 may be located in any convenient orientation on socket 22 so long as the core 32 is accessible through it.

As an optional feature, socket 22 may have spaces 37 (FIG. 2) spaced around the outside surface thereof. Spaces 37 may segment the surface to allow socket 22 to conform to any irregularities in the shape of ball-shaped end 26. Spaces 37 are sized so that socket 22 will not release ball-shaped end 26 during operation.

Figure 3:
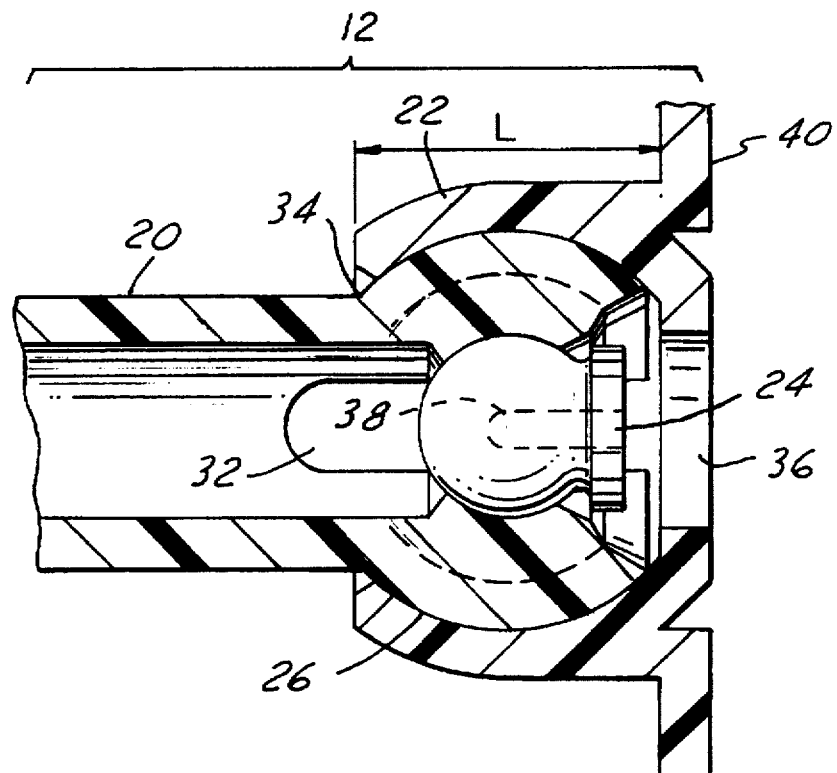
FIG. 3 is a cross-sectional view of a core lock pivot system.

Referring now to FIG. 3, an assembled core lock pivot system 12 is shown. The length L of socket 22 determines the amount of pivot that connection member 20 will pivot within socket 22. The shorter the socket length L, the further the amount of travel that may be implemented into connection member 20. The length L cannot be shorter than where the widest point of ball-shaped end 26 meets socket 22.

It is preferred that when assembled, the outer portion of ball-shaped end 26 rests against the inner walls of socket 22 so that a snug fit is attained. The amount of resistance when moving ball-shaped end 26 within socket 22 may be adjusted by adjusting the materials used to form the socket 22 and ball-shaped end 26. Of course, the friction between the surfaces may be reduced by using a lubricant.

Figure 4:
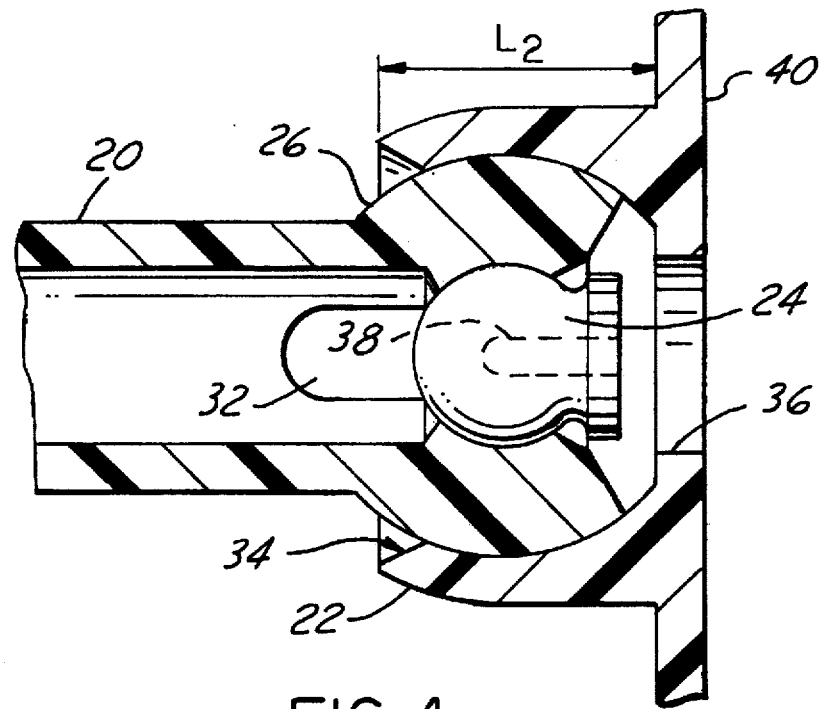
FIG. 4 is an alternative cross-sectional view of a core lock pivot system having a ball with wider range of movement than that of FIG. 3.

The amount of movement of the connection member 20 within socket 22 may be increased by decreasing the length L of the socket of FIG. 3 to the length $L_2$ of FIG. 4. That is, length $L_2$ extends a lesser distance from base 40 than does length L of FIG. 3. To further increase the amount by which connection member 20 may move within socket 22, the curvature within the socket has been increased so that the curvature extends to opening 36. The extended curvature gives more freedom of movement of the ball-shaped end 26 within the socket.

Figure 5:
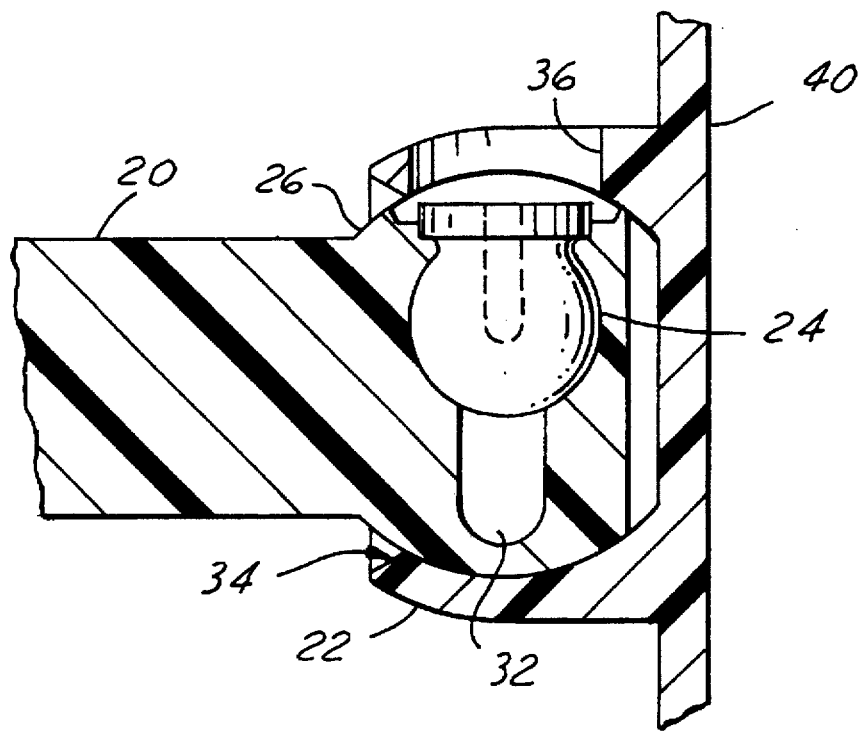
FIG. 5 is an alternative cross-sectional view of a core back pivot system having an access hole for the core in the side of the socket.

Referring now to FIG. 5, in an alternative configuration where opening 36 may be placed in the side of socket 22. Such a configuration allows more flexibility for aligning and installing the core lock within the core. Core lock 24 when inserted within opening 36 expands ball-shaped end 26 so that the ball-shaped end 26 cannot be removed from socket 22.

Figure 6:
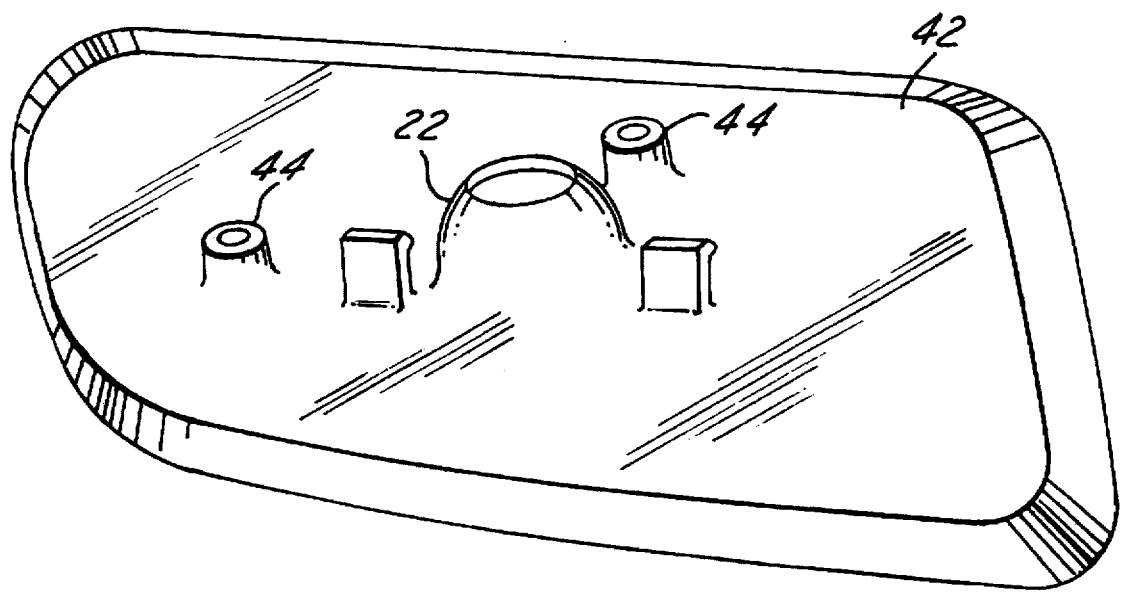
FIG. 6 is a perspective view of an outside rear view mirror base of an automotive vehicle having an integral socket.

Referring now to FIG. 6, a mirror base 42 is shown having an integrally formed socket 22. A connection member 20 having a ball-shaped end is placed within socket 22 to complete the pivot system. The opening to insert core lock 24 into the socket is on the opposite side of the mirror base 42. Other connecting structures 44 may be integrally formed with mirror base 42 so that pivot movement of mirror base 42 about ball-shaped end 26 may be achieved.

While the best mode for carrying out the present invention has been described in detail, those familiar with the art to which this invention relates will recognize various alternative designs and embodiments for practicing the invention as defined by the following claims:

What is claimed is:

1. A pivot connection system comprising:

an elongated member having a generally ball-shaped end;

a socket sized to receive said ball-shaped end, said socket having a first opening into which said ball-shaped end is inserted and a second opening;

said ball-shaped end having width greater than the width of said first opening, said ball-shaped end having a deformable hollow core: and a core lock sized to be received within said core through said second opening of said socket to prevent said core from deforming after said ball-shaped end is inserted into said socket, said core lock has a generally spherical shape with a first diameter;

said hollow core having a portion with a second diameter substantially equal to said first diameter, said ball-shaped end having at least a portion having a generally spherical shape with a third diameter larger than said first diameter.

2. A pivot connection system as recited in claim 1, wherein said core lock has an axially extending opening therein sized to receive an insertion tool.

3. A pivot connection system as recited in claim 1, wherein said first opening having the width less than the third diameter of said ball-shaped end.

4. A pivot connection system as recited in claim 1, wherein said socket is rigid.

5. A pivot connection system as recited in claim 1, wherein said socket is segmented.

6. A pivot connection system comprising:

an elongated member having a generally ball-shaped end;

a socket sized to receive said ball-shaped end, said socket having a first opening into which said ball-shaped end is inserted and a second opening;

said ball-shaped end having a deformable hollow core having a first width, said ball-shaped end formed of at least two segments separated by spaces in said ball-shaped end, said spaces cooperating with the hollow core to allow the core to deform; and a core lock sized to be received within said core through said second opening to prevent said core from deforming after said ball-shaped end is inserted into said socket, wherein said core lock has a generally spherical shape with a first diameter, wherein said hollow core has a portion having a second diameter substantially equal to said first diameter, wherein said ball shaped end having at least a portion having a generally spherical shape with a third diameter larger than said first diameter.

7. A pivot connection system as recited in claim 6, wherein said core lock has an axially extending opening therein sized to receive an insertion tool.

8. A pivot connection system as recited in claim 6, wherein said first opening having a width less than the third diameter of said ball-shaped end.

9. A pivot connection system as recited in claim 6, wherein said socket is rigid.

10. A pivot connection system as recited in claim 6, wherein said socket is segmented.

11. A method of forming a pivot connection comprising:

deforming a flexible ball-shaped end of an elongated member;

inserting the flexible ball-shaped end into a socket so that said member extends through a first opening in the socket;

inserting a ball shaped core lock into a hollow core of the ball-shaped end through a second opening in the socket; and preventing the deformation of the core using the ball shaped core lock to prevent the removal of said ball-shaped end from said socket.

12. A method of forming a pivot connection as recited in claim 11, wherein said step of inserting said core lock into the hollow core comprises the sub-step of placing a tool within an axially extending opening of said core lock.

13. A method of forming a pivot connection as recited in claim 11, further comprising the steps of removing the core lock from the ball-shaped end and removing the ball-shaped end from the socket.

* * * * *